(12) United States Patent
Kalhan

(10) Patent No.: US 8,194,609 B2
(45) Date of Patent: Jun. 5, 2012

(54) HANDOFF MANAGEMENT BASED ON NON-TRAFFIC STATE UPLINK SIGNALS

(75) Inventor: Amit Kalhan, La Jolla, CA (US)

(73) Assignee: KYOCERA Corporation, Kyoto (JP)

( * ) Notice: Subject to any disclaimer, the term of this patent is extended or adjusted under 35 U.S.C. 154(b) by 925 days.

(21) Appl. No.: 12/202,968

(22) Filed: Sep. 2, 2008

(65) Prior Publication Data

US 2010/0054206 A1 Mar. 4, 2010

(51) Int. Cl.
*G06F 17/00* (2006.01)
(52) U.S. Cl. ......... 370/331; 370/328; 370/332; 370/338
(58) Field of Classification Search ................... 370/331
See application file for complete search history.

(56) References Cited

U.S. PATENT DOCUMENTS

| | | |
|---|---|---|
| 6,195,551 B1 | 2/2001 | Kim et al. |
| 6,320,855 B1 | 11/2001 | Shi |
| 6,400,952 B2 | 6/2002 | Kim et al. |
| 6,671,265 B1 | 12/2003 | Hwang et al. |
| 6,694,138 B1 | 2/2004 | Kobylinski et al. |
| 6,725,042 B2 | 4/2004 | Park |
| 7,043,243 B2 | 5/2006 | Kobylinski et al. |
| 7,145,890 B1 | 12/2006 | Seo et al. |
| 7,242,938 B2 | 7/2007 | Kobylinski et al. |
| 7,260,399 B1 * | 8/2007 | Oh et al. .................. 455/436 |
| 2002/0075823 A1 * | 6/2002 | Lee et al. .................. 370/328 |
| 2006/0025138 A1 * | 2/2006 | Kotzin ........................ 455/445 |
| 2008/0039089 A1 * | 2/2008 | Berkman et al. .......... 455/436 |
| 2009/0129341 A1 | 5/2009 | Balasubramanian et al. |
| 2010/0054205 A1 | 3/2010 | Kalhan |

* cited by examiner

*Primary Examiner* — Jeffrey Pwu
*Assistant Examiner* — Sulaiman Nooristany

(57) ABSTRACT

A detecting base station receives a non-traffic state uplink signal transmitted from a wireless communication device to an originating base station. The originating base station transmits a search message instructing the wireless communication device to search for an alternate base station.

19 Claims, 7 Drawing Sheets

HANDOFF MANAGEMENT BASED ON NON-TRAFFIC STATE UPLINK SIGNALS

RELATED APPLICATIONS

This application is related to U.S. patent application entitled "HANDOFF MANAGEMENT FOR MULTIMODE DEVICES BASED ON NON-TRAFFIC STATE UPLINK SIGNALS", Ser. No. 12/202,917, filed concurrently with this application and incorporated by reference in its entirety, herein.

BACKGROUND

The invention relates in general to wireless communication systems and more specifically to managing handoffs in a wireless communication system.

Base stations in cellular communication systems provide communications services to wireless communication devices within geographical cells where each base station exchanges signals with wireless communication devices within an associated cell. The size and shape of each cell is determined by several factors and are at least partially based on design parameters of the base station. In addition to large macro cells that provide services to numerous devices within relatively large geographical areas, some cellular communication systems are increasingly employing smaller cells to increase efficiency, improve coverage, improve the quality of service, and provide additional services. The smaller cells may include a variety of sizes typically referred to as microcells, picocells and femtocells. Microcells and picocells are often implemented within office buildings, shopping centers and urban areas in order to provide additional security, higher user capacity for the area, additional service features, and/or improved quality of service. Femtocells have relatively smaller geographical areas and are typically implemented at residences or small office locations. Since typical cellular backhaul resources may not be available in these locations, femtocells are sometimes connected to the cellular infrastructure through DSL or cable modems. Femtocells are part of the cellular network and, therefore, communicate with the wireless devices using the same techniques as those used by macrocells.

SUMMARY

A detecting base station receives a non-traffic state uplink signal transmitted from a wireless communication device to an originating base station. In response to the reception of the non-traffic state uplink signal, the detecting base station transmits a device proximity message that invokes transmission of a search message to the wireless communication device to adjust a base station searching scheme.

DETAILED DESCRIPTION

Figure 1:
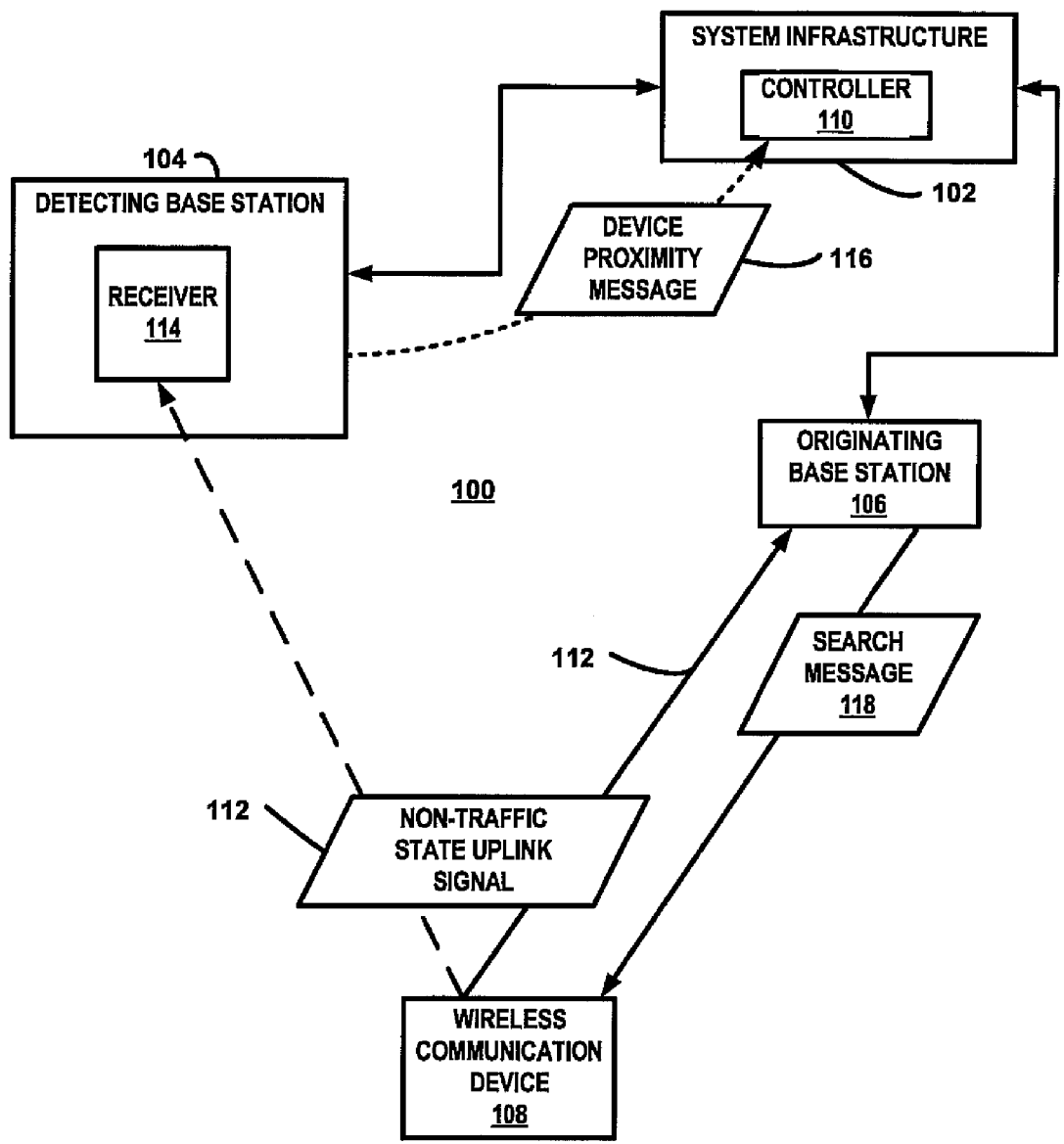
FIG. 1 is a block diagram of a communication system in accordance with the exemplary embodiment of the invention.

FIG. 1 is a block diagram of a communication system 100 in accordance with an exemplary embodiment of the invention. The communication system 100 may be implemented in accordance with any of numerous technologies and communication standards. For the examples discussed below, the system operates in accordance with a Code Division Multiple Access (CDMA) standard such as cdma2000 1X. Examples of other suitable communication standards include other CDMA standards such as 1xEV-DO and W-CDMA, OFDM based standards, and GSM standards. The various functions and operations of the blocks described with reference to the communication system 100 may be implemented in any number of devices, circuits, and/or elements as well as with various forms of executable code such as software and firmware. Two or more of the functional blocks of FIG. 1 may be integrated in a single device and the functions described as performed in any single device may be implemented over several devices. For example, at least portions of the functions of the system infrastructure 102 may be performed by the base station 104, a base station controller, or a Mobile Switching Center (MSC) in some circumstances.

The communication system 100 includes system infrastructure 102 that is connected to one or more base stations 104, 106. Communications between the base stations 104, 106 and wireless communication devices 108 are at least partially managed by the system infrastructure 102. A controller 110 within the system infrastructure 102 includes hardware, software and/or firmware for receiving and sending control messages. The controller 110 may include at least portions of a BSC and a MSC. For the example discussed herein, the controller 110 is the equipment within the system 100 that performs wireless device paging functions and generates paging channel messages.

For the exemplary situation illustrated in FIG. 1, the wireless communication device 108 is in a non-traffic state and communicating with an originating base station 106. In order to conserve power, the wireless communication device 108 may be placed in at least two states that include a traffic state and a non-traffic state. During the traffic state (sometimes referred to as an active state), the wireless communication device 108 can exchange, with a base station, control signals as well as communication signals including information such as voice and data signals. During the non-traffic state, a portion of the circuitry is turned off or placed in a low power state at least a portion of the time the wireless communication device is in the non-traffic state to conserve power. At least some transceiver circuitry, however, is at least periodically activated during the non-traffic state to exchange non-traffic state signals with the base station. The non-traffic state may include other states which may differ depending on the particular communication technology. The non-traffic state is a state where data traffic is not exchanged with the wireless communication device and may be an idle state, a dormant state, a semi-connected state, a sleep state, or other such state. Downlink signals, which are also referred to as forward link signals, are transmitted from base stations to wireless communication devices. Uplink signals, also referred to as reverse link signals, are signals transmitted from wireless communication devices to base stations. Accordingly, non-traffic state uplink signals are signals transmitted from the wireless communication device to the originating base station when the wireless communication device is in a non-traffic state, such as an idle state or dormant state, and non-traffic state downlink signals are signals transmitted from the originating base station to the wireless communication device when the wireless communication device is in a non-traffic state such as the idle state or dormant state. Examples of non-traffic state downlink signals include paging signals, control signals, power control signals, and network update signals. Examples of non-traffic state uplink signals include signals that convey information related to a handoff procedure, an acknowledgement procedure, a registration procedure, a resynchronization procedure, a network access request and a response message transmission.

When the wireless communication device 108 is sufficiently close to the detecting base station, the detecting base station 104 can receive the non-traffic state uplink signals 112 transmitted by the wireless communication device to the originating base station. The detecting base station 104, therefore, eavesdrops on the uplink channels used by one or more wireless communication devices. A receiver 114 at the detecting base station 104 is tuned to the appropriate code channel and/or frequency to intercept the non-traffic state uplink signal 112. Since the detecting base station is synchronized with the system infrastructure, the detecting base station 104 is aware of the time slot boundary and the timing of uplink signals. In some circumstances, the detecting base station 104 may only search for wireless communication devices that are authorized to use the detecting base station 104. An authorized list of serial numbers or other device identifiers are stored in memory at the detecting base station. The non-traffic state uplink signal 112 is shown as a solid line to the originating base station 106 and as a dashed line to the detecting base station 104 to illustrate that the non-traffic state uplink signal 112 is transmitted to the originating base station 106 by the wireless communication device 108 for reception by the originating base station 106 and that the detecting base station 104 is eavesdropping on the channel. Accordingly, the wireless communication device 108 is not targeting transmissions to the detecting base station 104 for the situation shown in FIG. 1 since it is not yet aware of the detecting base station 104.

In response to receiving the non-traffic state uplink signal 112, the detecting base station sends a device proximity message 116 to the controller 110 which invokes the originating base station 106 to transmit a search message 118 to the wireless communication device 108. Although the controller 110 is illustrated as part of the system infrastructure 102, it may be part of the base station 106 or collocated with the base station 106. The controller 110 may include, or may be part of, the MSC, BSC or other infrastructure. As discussed above, the controller 110 includes the hardware and software for generating the search message 118 and, for this example, is the same equipment used to generate paging channel messages. The search message 118 triggers an adjustment of the wireless communication device searching scheme that the wireless communication device 108 employs for searching for alternate base stations. Accordingly, the wireless communication device 108 changes one or more searching parameters of the searching scheme in response to receiving the search message 118. Any combination of numerous parameters can be adjusted where the adjustments increase the likelihood of the wireless communication device 108 detecting a signal transmitted by the detecting base station 104. The search message 118 may result in a change in the search scheme to devote more resources to search for an alternate base station or may result in a change in resources to search for the specific detecting base station 104. In some circumstances, therefore, the search message 118 may specifically instruct the wireless communication device 108 to search for the detecting base station 104. For the example, the search message 118 is transmitted using the paging channel. Any suitable downlink channel monitored by the wireless communication device 108 during the non-traffic state, however, may be used. The wireless communication device 108 searches for signals transmitted by alternate base stations in accordance with the searching scheme Alternate base station signals from frequencies and/or technologies different than those by the base station 106 may be searched. The wireless communication device 108 searches for pilot signals although other signals may be searched. For example, the wireless communication device 108 may search for beacon signals in some situations. Examples of searching parameters include a total time period for searching, time periods for searching particular frequencies, the frequency of searching, the frequency of searching particular frequencies, the groups of frequencies searched, the portions of channels searched, the receiver settings for searching and type of communication technology. Other searching parameters will be apparent to those skilled in the art based on these teachings. During the non-traffic state, the wireless communication device 108 periodically activates circuitry for performing an alternate base station search. Between the search periods, the device 108 may enter a sleep mode or perform other non-traffic state tasks such as exchanging non-traffic state signals with the originating base station 106. In some cases, the wireless communication device 108 may search for alternate base stations while performing other non-traffic state communications with the originating base station 106. As discussed in further detail below with reference to FIG. 3A, therefore, the search message 118 includes information that results in an adjustment of one or more of the search parameters.

For the present example, the device proximity message 116 is sent in response to receiving the non-traffic state uplink signal 112 from an authorized user of the detecting base station 104. The search message 118 is sent to the wireless communication device 108 in response to receiving the device proximity message 116 at the controller 110. In some situations, however, additional criteria may be evaluated before sending the device proximity message 116, the search message 118, or before sending both. As discussed below, for example, the detecting base station 104 may evaluate one or more parameters to determine the proximity of the wireless communication device 108 to the detecting base station 104 and only send the device proximity message 116 if the calculated proximity is less than a threshold. Also, the controller 110 may evaluate system conditions and refrain from sending the search message 118 if certain system conditions are not met.

Examples of data that may be evaluated by the detecting base station 104 include the capacity of the detecting base station 104, bandwidth requirements of the wireless communication device 108 and a calculated or estimated proximity of the wireless communication device 108 to the detecting base station 104. Accordingly, the detecting base station may evaluate a characteristic of the non-traffic state uplink signal to determine whether to transmit the device proximity message 116. In the example, the reception of the non-traffic state uplink signal 112 by the receiver 114 is sufficient to determine that the wireless communication device 108 is present and that the device proximity message should be transmitted. In other circumstances, other signal characteristics may be evaluated to determine the proximity. Therefore, a characteristic of the non-traffic state uplink signal 112 may be any of numerous parameters with any of numerous thresholds depending on the particular implementation and the characteristic may be whether the non-traffic state uplink signal 112 is detectable by the base station receiver. Examples of other characteristics include a signal to noise ratio (SNR), bit error rate (BER), power level, signal propagation time, and presence of particular data. An example of technique for determining the proximity is discussed in U.S. patent application Ser. No. 11/565,266 entitled "APPARATUS, SYSTEM AND METHOD FOR MANAGING WIRELESS LOCAL AREA NETWORK SERVICE TO A MULTI-MODE PORTABLE COMMUNICATION DEVICE", filed on Nov. 30, 2006, and incorporated by reference in its entirety herein. For the examples discussed herein, the characteristic of the signal is the adequacy of the non-traffic state uplink signal 112 to be demodulated and decoded by the base station 104 using a long code mask corresponding to authorized users of the detecting base station 104. Although the detecting base station may not be able to decode the information on the uplink signal, the detecting base station may recognize the user using the long-code mask or other identifying information within the signal, The device proximity message 116 and search message 118 may have any of numerous relationships and each message may be dependent on the information within, the format of, and/or other characteristics of the other message. For example, the device proximity message 116 and the search message 118 may be same message in some circumstances. Such a situation occurs where the device proximity message 116 is an SMS message sent directly from the detecting base station to the wireless communication device 108 indicating that a non-traffic state uplink signal 112 transmitted from the device 108 has been detected by the detecting base station 104. The wireless communication device 108 interprets the device proximity message 116 as a search message 118 indicating that the search parameters should be changed. Transmitting the search message 118 within the paging channel, however, allows for minimizing power consumption since additional resources are not invoked to receive SMS messages.

The base stations 104, 106 provide wireless services within geographical services areas sometimes referred to as cells. As discussed below with reference to FIG. 2A, FIG. 2B, and FIG. 2C, the originating base station 106 provides wireless service within a geographical service area that may overlap, completely surround, or be separate from the geographical service area of the base station 104. As discussed below, a suitable implementation of the detecting base station 104 is within a cellular communication system where the detecting base station 104 provides wireless communication services within a femtocell to authorized users. The base station 104, however, may be any base station within a communication system that can provide service to the wireless communication device and receive the non-traffic state uplink signal.

After receiving the search message, the wireless communication device searches for an alternate base station in accordance with the adjusted search scheme. In response to the search message, the wireless communication device activates the appropriate circuitry to receive signals transmitted by the detecting base station such as a beacon pilot signal or communication pilot signals. In most situations, such circuitry is periodically activated in accordance with the search scheme to the reception of the search message and the search message does not directly trigger the activation of the receive circuitry. The adjusted search scheme, however, may result in more frequent activation of the circuitry. The detecting base station 104 generates and transmits a communication pilot signal which provides control and timing information to the wireless communication device 108. In some circumstances, the detecting base station may refrain from transmitting pilot signals until a wireless communication device is detected and the proximity message is sent. In addition, the detecting base station may transmit a beacon pilot signal. After the detecting base station is found by the wireless communication device, the wireless communication device may engage in a handoff procedure where, after a determination that the wireless communication device should be handed off to the detecting base station, the system 100 establishes wireless service to the wireless communication device from the detecting base station.

Figure 2A:
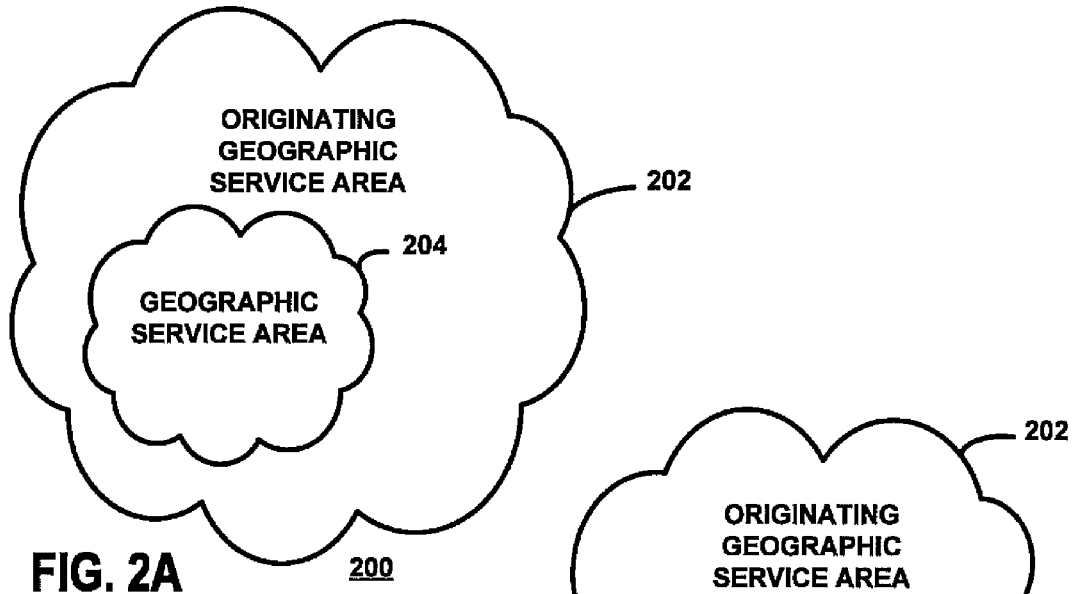
FIG. 2A is an illustration of an exemplary geographical service area relationship provided by an originating base station and detecting base station where the geographic service area of a detecting base station is within an originating geographic service area of the originating base station.
Figure 2B:
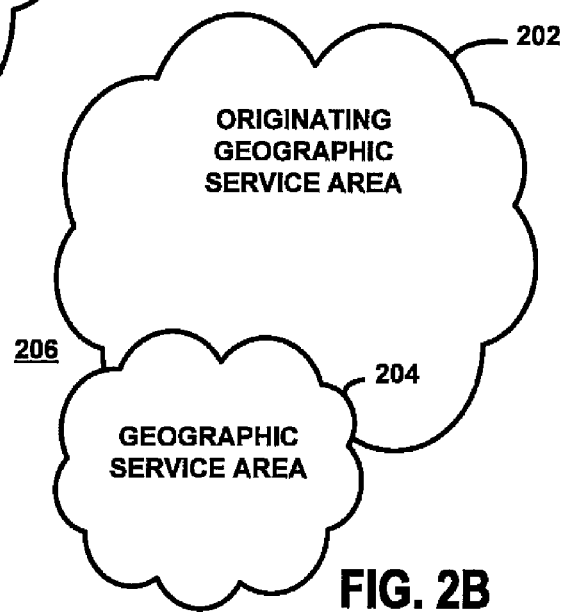
FIG. 2B is an illustration of an exemplary geographical service area relationship provided by the originating base station and the detecting base station where the geographic service area of a detecting base station overlaps with the originating geographic service area of the originating base station.
Figure 2C:
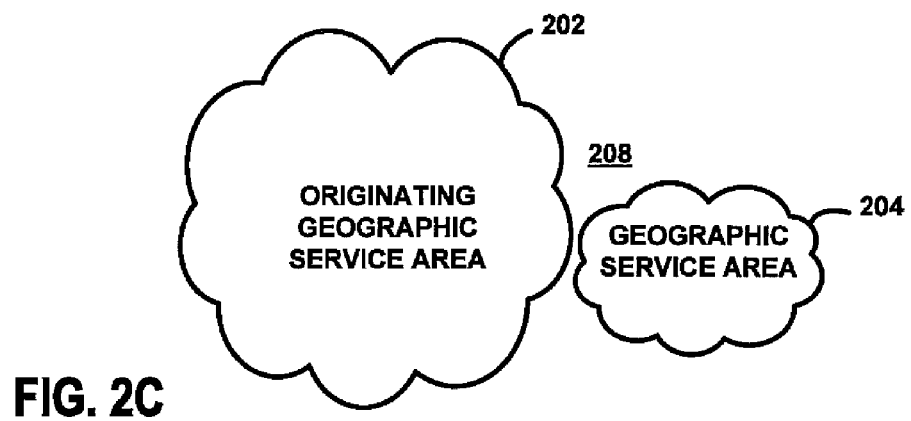
FIG. 2C is an illustration of an exemplary geographical service area relationship provided by the originating base station and the detecting base station where the geographic service area of a detecting base station does not overlap with the originating geographic service area of the originating base station.

FIG. 2A, FIG. 2B and FIG. 2C are depictions of exemplary geographical service area relationships 200, 206, 208 provided by the originating base station 106 and the detecting base station 104. An originating geographical service area 202 provided by the originating base station 106 and a geographic service area 204 provided by the detecting base station 104 may have any of numerous shapes, sizes, and configurations. Accordingly, the clouds representing the service areas generally illustrate the relationships between the service areas and do not necessarily depict the actual shapes of the service areas. Further, the service areas may contain holes of coverage where service is unavailable. In the interest of clarity and brevity, such features are not illustrated in the figures. In FIG. 2A, the service area 204 of the detecting base station 104 is completely within the service area 202 provided by the originating base station 106. Such service area relationships 200 often occur where some base stations within the communication system provide smaller service regions such as microcell, picocell, and femtocell configurations. A femtocell arrangement, for example, may include a femtocell base station (detecting base station 104) located at a residence where the femtocell is a service area for devices used by device users living at the residence. When the wireless communication devices are outside the service area 204, service is provided by larger macrocells (e.g. originating base station 106). When the authorized wireless communication device is at the residence, however, service is provided by the base station presenting the smaller femtocell service area 204. Accordingly, in most situations, the service area 204 of the detecting base station 104 will be completely within the service area 202 of the originating base station 106. In some situations, however the service area 204 may be partially overlapping with the service area 202 as shown in FIG. 2B or may be non-overlapping but adjacent to the service area 202 as shown in FIG. 2C.

Figure 3A:
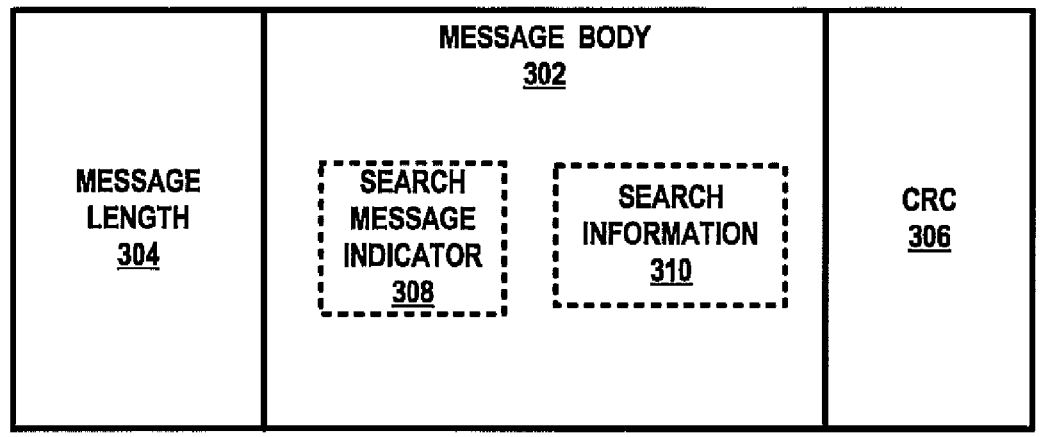
FIG. 3A is a block diagram of the search message.

FIG. 3A is a block diagram of the search message 118 where the search message 118 is transmitted within a paging channel message 300. The search message 118 may contain any of several types of information, may have any of numerous formats, and may be transmitted using a variety of channels and signals. For this example, the search message 118 is contained within the message body 302 of a paging channel message 300 in accordance with one or more CDMA standards. A CDMA paging channel message is typically included within a PC message capsule where each paging channel message 300 includes a message length field 304, a message body 302, and a cyclic redundancy check (CRC) 306.

For the example, the search message 118 includes a search message indicator 308 and search information 310 disposed within the message body 302. The search message indicator 308 is any number of bits that indicates to the wireless communication device that the paging message is a search message 118. The search information 310 includes information related to the search scheme adjustment. In some cases, the search message indicator 308 is sufficient to notify the wireless communication device of a need to adjust the searching scheme and the search information 310 may be omitted. The search information, however, may include any of numerous parameters related to the adjusting the searching scheme. As discussed below in further detail, the search information 310 may include information that identifies one or more base stations that should be searched or frequencies that should be searched, The search message 118 includes information that results in an adjustment of one or more of the search parameters. In some situations, the search message 118 may only indicate that a more robust search should be performed and the wireless communication device adjusts searching resources in response. The searching information 310 may be omitted in this case. The search change may be a preprogrammed adjustment or a dynamic adjustment based on other criteria observed by the wireless communication device. For example, if some detection of energy had been recently observed in a particular channel, the adjustment in search parameters may be adjusted to more heavily target resources to searching that particular channel as compared to the resources that would have been applied to the channel if the search message were not received. In an example where the search scheme is preprogrammed that is not based on other criteria, the wireless communication device may search in accordance with a scheme utilized prior to receiving the search message 118 but may increase search times or reduce the periods between searches.

The search message 118 may also include information 310 identifying a group of base stations that may be available. Such an indication may be a specific identifier specifically identifying one or more base stations or may be a general identification identifying a group of base stations such as an identifier indicating all authorized femtocell base stations. Since the wireless communication device includes a list of all femtocell base stations that the device is authorized to access, a general identifier will provide sufficient information for identifying specific base stations.

In some circumstances, the search message 118 may indicate specific frequencies. A pilot frequency or beacon frequency of the detecting base station may be identified, for example.

Figure 3B:
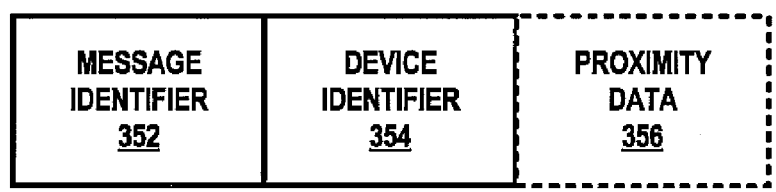
FIG. 3B is block diagram of a device proximity message.

The wireless communication device extracts the information from the search message and adjusts the searching scheme in accordance with search message 118. The adjustment may include any of numerous parameter changes where some examples adjusting one or more of the following: frequencies searched, channels searched, period between searches, period between searches of specific frequencies, time period of search, time period for search at specific frequencies, search offsets, location of starting search in the search-space, and searcher receiver settings. In circumstances where the wireless communication device searches for service from a system utilizing a different communication technology and universal searcher is used, similar parameters may be adjusted. Where a new searcher is invoked for the alternate technology base station, the parameters may also include the timing of the activation of the new searcher, FIG. 3B is block diagram of a device proximity message 116 that includes a message identifier 352, and a device identifier 354. In some cases, proximity data 356 may also be included. The proximity data 356 is illustrated with dashed lines to indicate that this feature is optional. The device proximity message may have any of numerous formats and may be sent using any suitable signaling method. The message identifier 352 includes any combination of data that indicates to the controller 110 that the message 116 is a device proximity message. Accordingly, the message identifier 352 may be a single bit flag in some circumstances. The device identifier 354 includes data that identifies the wireless communication device 108 that has been detected by the detecting base station 104. One example of a device identifier 354 is a device serial number.

Figure 4:
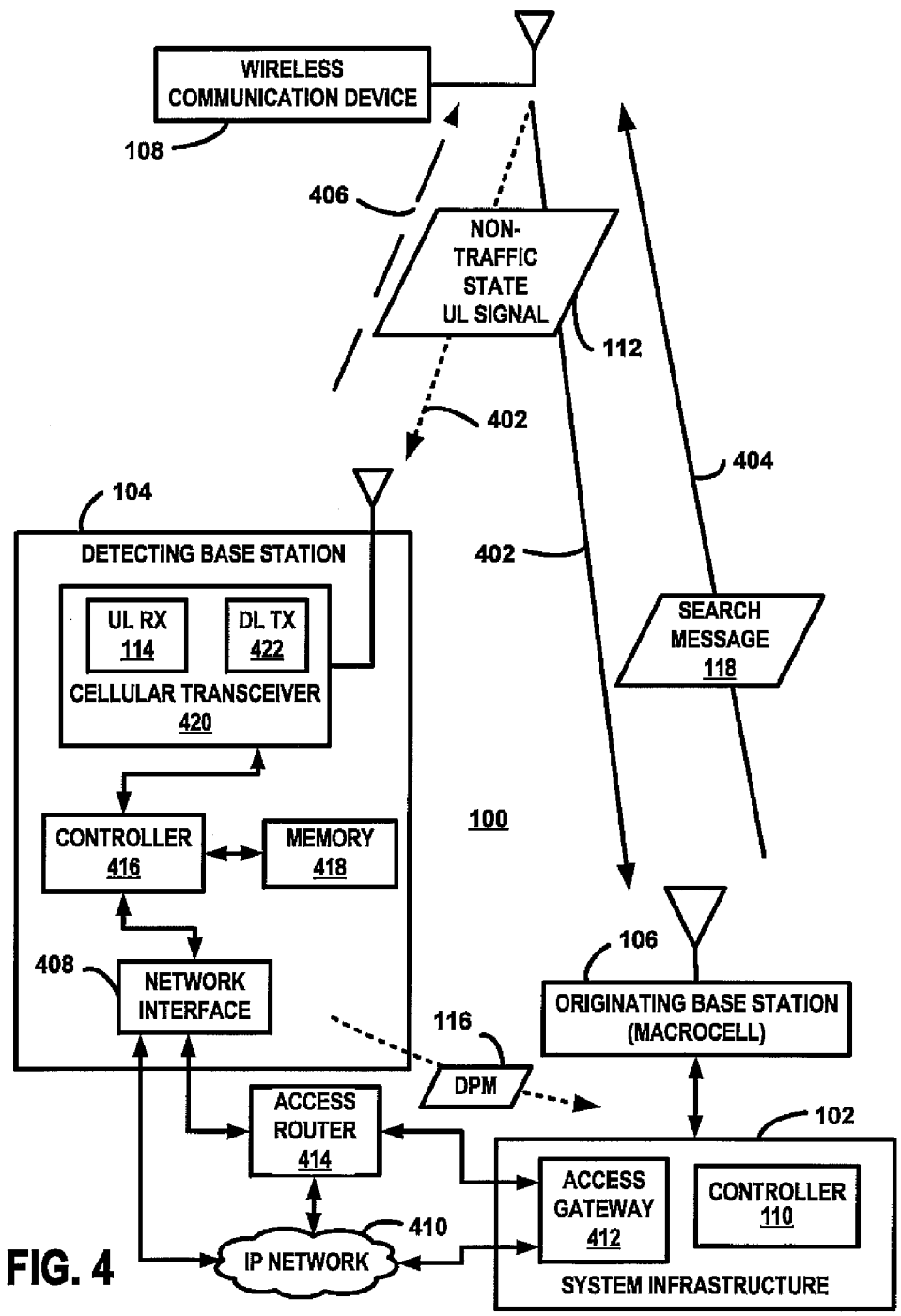
FIG. 4 is a block diagram of an exemplary communication system where the non-traffic state uplink signal is an intercepted non-traffic state uplink (reverse link) cellular signal.

FIG. 4 is a block diagram of an exemplary communication system 100 where the non-traffic state uplink signal 112 is an intercepted non-traffic state uplink (reverse link) cellular signal 402. The system 100 may be implemented using any variety of communication technologies and cell sizes. For the example discussed with reference to FIG. 4, the detecting base station 104 provides wireless service within a femtocell and the originating base station 106 provides service within a macrocell. The base stations 104, 106 operate in accordance with CDMA protocols and standards. The term macrocell is used primarily to distinguish this group of diverse technologies from picocells and femtocells that typically have smaller service areas on the order of 100 to 300 feet per base station. Accordingly, the originating base station 106 is any base station that provides wireless communication services within relatively large geographical areas as compared to the femtocell service area provided by the detecting base station in the example of FIG. 4. The functional blocks of FIG. 4 may be implemented using any combination of hardware, software and/or firmware. Two or more of the functional blocks may be integrated in a single device and the functions described as performed in any single device may be implemented over several devices. For example, at least portions of the functions of the system infrastructure 102 and controller 110 may be performed by the base station 106, a base station controller, or an MSC in some circumstances.

The originating base station 106 transmits downlink (forward link) signals 404 to, and receives uplink (reverse link) signals 402 from, one or more wireless communication devices 108 to provide wireless communication service. For the example of FIG. 4, the signals 402, 404 are non-traffic state signals that are transmitted while the wireless communication device is in the non-traffic state. Signals are also exchanged when the wireless communication device 108 is in the active state. The detecting base station 104 receives the non-traffic state uplink signal 112 by eavesdropping on the uplink channel used by the wireless communication device 108. The detecting base station 104 transmits a detectable downlink signal 406 that is detected by the wireless communication device 108 after the wireless communication device 108 searches for the detecting base station 104.

The system infrastructure 102 includes the controller 110 that may be implemented as a mobile switching center (MSC), a combination of an MSC and base station controllers (BSCs), or other similar communication controllers and/or servers. The controller 110 is connected to the base stations 104, 106 through the system infrastructure 102 and manages communications within the system 100. A network interface 408 within the detecting base station 104 facilitates communication with an IP network 410. The network interface 408 provides packet data communications and facilitates access to the Internet and to an access gateway 412 in the system infrastructure 102 through the access router 414 or directly through the IP network 410. The access router 414 may be connected to several base stations 104 and provides communication management and control functions to the detecting base station 104. In some situations, the access router 414 may be implemented within the detecting base station 104 or may be eliminated. In some circumstances, the connection between the access gateway 412 and the base station 104 may include a wireless communication link such as satellite communication link or point-to-point microwave link, for example. Also, in some situations, circuit switched connections may be used to connect the detecting base station 104 to the system infrastructure 102. In a typical arrangement, the detecting base station 104 is connected to the Internet through an Internet Service Provider (ISP) service provided by a digital subscriber line (DSL) or CATV connection. Accordingly, the access router 414 is a DSL modem or cable modem in the typical arrangement. In the example, therefore, the system infrastructure 102 comprises a packet switched core network that includes at least one access gateway 412. The access gateway 412 is a communication interface that allows the base station 104 to communicate with the system infrastructure 102.

The wireless communication device 108 is any type of communication device that is capable of communicating with the base stations 104, 106. The wireless communication device 108, sometimes referred to as an access terminal, may be a wireless modem, a personal digital assistant (PDA), cellular telephone, or other such device.

In addition to the functions and features discussed herein, the detecting base station 104 operates in accordance with the communication protocols of the communication system 100 and is a femtocell base station. The base station 104 includes a controller 416, memory 418, cellular transceiver 420 and the network interface 408 in addition to other devices and software for performing the functions of the base station 104. The cellular transceiver 420 includes the uplink receiver 114 and a downlink transmitter 422.

In addition to other information, the memory 418 stores communication device identification values corresponding to each communication device 108 that is authorized to receive service from the base station 104. The communication device identification value may include an electronic serial number (ESN), Mobile station Equipment Identifier (MEID) or International Mobile Subscriber Identity (IMSI) or other unique data identifying the wireless communication device 108. An example of a group of identification values stored in memory 418 includes a collection of ESNs corresponding to the communication devices of the family members of a household where the base station 104 provides service. The identification values may be stored at the base station 104 using any of numerous techniques. An example of a suitable method of storing the values includes storing the values during an initialization procedure performed when the base station 104 is installed. The identification values may be provided, at least partially, by the core network or the macrocell base station 106. In some implementations, the identification values may be omitted or the base station 104 may allow communication devices that do not have corresponding identification values stored at the base station 104 to receive service from the base station 104. As discussed below, the ESNs are used to generate long code masks such as public long code masks (PLCMs) which allow the detecting base station to receive signals from the wireless communication device 108 having the particular ESN. Other information may be received from the core network to generate the PLCMs in accordance with known techniques. In some situations, the core network, or base station may assign the PLCM to a particular wireless communication device 108. The assigned PLCM value is stored in the base station 104. Also, a private long code mask may be used instead of, or in addition to, the PLCM in some cases. The identification information may be embedded in, or part of, the uplink signal such as the pilot, beacon, preamble, portion of data.

When the wireless communication device 108 is in a non-traffic state, such an idle state, the downlink signals 404 are transmitted using a non-traffic state channel such as a WWAN paging channel, the quick paging channel or other channel that carry signals such as control signals, and network update signals. The wireless communication device 108 transmits non-traffic state uplink signals 112 such as signals that convey information related to a handoff procedure, an acknowledgement procedure, a registration procedure, a resynchronization procedure, a network access request and a response message transmission when in the non-traffic state.

During operation, the detecting base station 104, monitors, at least periodically, a wireless channel that may include the non-traffic state uplink signal 112. The non-traffic state uplink signal 112 may be any non-traffic state signal transmitted by the communication device 108, including but not limited to, registration messages, acknowledgement messages, and other signaling messages transmitted from the wireless communication device 108 during the non-traffic state. For the example of FIG. 4, the detection base station 104 monitors the uplink cellular channel used for transmitting non-traffic state signals from wireless communication devices 108 to the originating base station (macrocell base station) 106. The cellular uplink receiver 114 is tuned to the appropriate channel or channels to detect the uplink signal 402 transmitted by the wireless communication device 108. For the example, the uplink receiver 114 sufficiently demodulates and decodes uplink signals to identify the long code mask. The long code mask is typically a 42 bit binary number that is unique to the wireless communication device 108. The received signals are compared to a list of long code masks to determine if the signal was transmitted by an authorized wireless communication device 108. As described above, the authorized wireless communication devices are identified by device identifiers stored in memory. The identifiers either directly, or indirectly, correspond to long code masks that facilitate reception of the signals transmitted by the authorized devices in the exemplary embodiment. Typically, the PLCM is derived from a permutation of the bits of the ESN. PLCM may also be based on the Mobile station Equipment Identifier (MEID) or the International Mobile Subscriber Identity (IMSI). The detecting base station can identify authorized users by demodulating and decoding the non-traffic state signal, extracting the device identifier and comparing the value to authorized device identifiers stored in memory. In some situations, the base station 104 evaluates one or more characteristics of the uplink signal to determine if the wireless communication device transmitting the signal is within the service area of the base station or at least whether the device is possibly within the service area of the detecting base station 104. For this example, the controller 416 determines if the non-traffic state uplink signal 112 (uplink signal 402) is successfully received at the detecting base station 104. If the signal can be received, the controller 416 determines that the wireless communication device 108 is sufficiently close to receive service from the base station 104. In some cases, the uplink signal may be detected and received even though the wireless communication device 108 is not within the service area of the base station 104. In these circumstances, the wireless communication device 108 may unsuccessfully attempt to acquire service from the base station 104 after receiving the search message 118 from the macrocell base station 106.

In some situations, the determination of whether to transmit the device proximity message 116 may be based on other characteristics of the non-traffic state uplink signal in addition to the detection of the non-traffic state uplink signal. For example, the proximity of the wireless communication device 108 to the detecting base station 104 may be calculated or estimated based on characteristics of the non-traffic state uplink signal 112 and the device proximity message 116 may be transmitted only when the estimated proximity is less than a proximity threshold. Examples of detection signal characteristics include a signal to noise ratio (SNR), bit error rate (BER), frame error rate (FER), packet error rate (PER), power level, and signal travel time.

The controller 416 determines, or at least estimates, the proximity of the authorized wireless communication device 108 to the detecting base station 104 based on one or more characteristics of the uplink signal. In the exemplary embodiment, the detection of an uplink signal from the communication device 108 is sufficient to determine that the communication device 108 is within a proximity range. The proximity is used to determine whether the communication device 108 is possibly within range of the base station 104 and at least possibly able to receive communication service from the base station 104. Therefore, the controller 416 at least determines whether the communication device is possibly within range of the base station 104. If the controller 416 determines that the wireless communication device 108 is possibly in range, the device proximity message 116 is sent to the controller 110 in the system infrastructure 102 which results in the transmission of the search message 118 to the wireless communication device 108.

The controller 416 may determine whether to transmit the device proximity message 116 based on factors other than proximity of the wireless communication device 108 or the detection of the non-traffic state uplink signal 112. For example, factors may include the available capacity of the detecting base station 104, core network requirements, required bandwidth of the wireless communication device communications, and availability of other base stations or communication service providers in the area. Accordingly, the base station 104 may not transmit the device proximity message even if the wireless communication device is within range in some circumstances. In some situations, the device proximity message 116 is transmitted every time a wireless communication device is detected by the detecting base station and the system infrastructure 102 determines whether to transmit the search message 118.

The device proximity message is generated by the controller 416 and transmitted through the network interface 408, through the IP network 410 and/or the access router 414 to the access gateway 412. The access gateway 412 routes the device proximity message through the system infrastructure 102 to the controller 110. As described above, for the discussed example, the controller 110 is the same equipment that is used to generate paging messages to the wireless communication device 108. The controller 110 receives the device proximity message and extracts the appropriate information. In response to the device proximity message 116, the controller 110 generates the search message 118 which is transmitted from the macrocell base station 106 to the wireless communication device 108. As discussed above, the search message 118 triggers an adjustment of the wireless communication device searching scheme that the wireless communication device 108 employs for searching for alternate base stations. The wireless communication device 108, therefore, changes one or more searching parameters of the searching scheme in response to receiving the search message 118. Any combination of numerous parameters can be adjusted where the adjustments increase the likelihood of the wireless communication device 108 detecting a signal transmitted by the detecting base station 104. The search message 118 may result in a change in the search scheme to devote more resources to search for an alternate base station or may result in a change in resources to search for the specific detecting base station 104. In some circumstances, the search message 118 may specifically instruct the wireless communication device 108 to search for the detecting base station 104.

Figure 5:
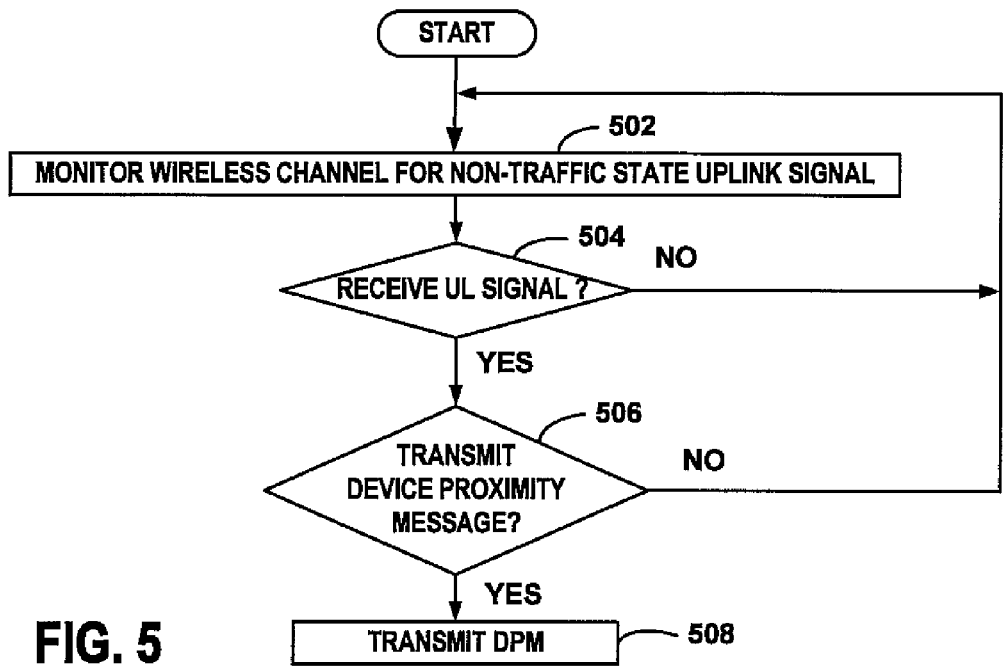
FIG. 5 is flow chart of a method of managing wireless service to a wireless communication device performed at the detecting base station.

FIG. 5 is flow chart of a method of managing wireless service to a wireless communication device 108 performed at the detecting base station 104. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 416 in the detecting base station 104.

At step 502, the wireless channel that may contain an non-traffic state uplink signal 112 is monitored. The uplink receiver 114 attempts to demodulate and/or decode incoming signals within the wireless communication channel. In this example, the uplink receiver 114 is tuned to decode any uplink signals 402 transmitted from any of the communication devices 108 in the user list stored in memory 418. The long code masks derived with the device identification values are applied to incoming signals until an incoming non-traffic state uplink signal is detected.

At step 504, it is determined whether a non-traffic state uplink signal 112 has been received. In this example, the controller 416 determines that a non-traffic state uplink signal 112 has been received if an incoming uplink signal can be decoded and determined to be a non-traffic state signal transmitted from an authorized wireless communication device 108. If a non-traffic state uplink signal 112 has been received, the method continues at step 506. Otherwise, the method returns to step 502 to continue monitoring the wireless channel.

At step 506, it is determined whether the device proximity message 116 should be transmitted. In some situations, step 506 can be omitted and the device proximity message 116 may be transmitted when the non-traffic state signal 112 is detected. This procedure is discussed with reference to FIG. 8. In other situations, however, additional processing or communication is invoked that occur before the device proximity message is transmitted. For example, system conditions of the detection base station 104, other base stations, the core network, and/or alternate networks can be evaluated to determine whether a handoff to the detecting base station 104 is desired. An example of such a procedure is discussed with reference to FIG. 9. If it is determined that the device proximity message 116 should be transmitted, the method continues at step 508. Otherwise, the method returns to step 502.

At step 508, the device proximity message 116 is sent to the system infrastructure. The device proximity message 116 at least identifies the wireless communication device 108 and indicates that the device 108 may be within, or near, the service area of the detecting base station 104.

Figure 6:
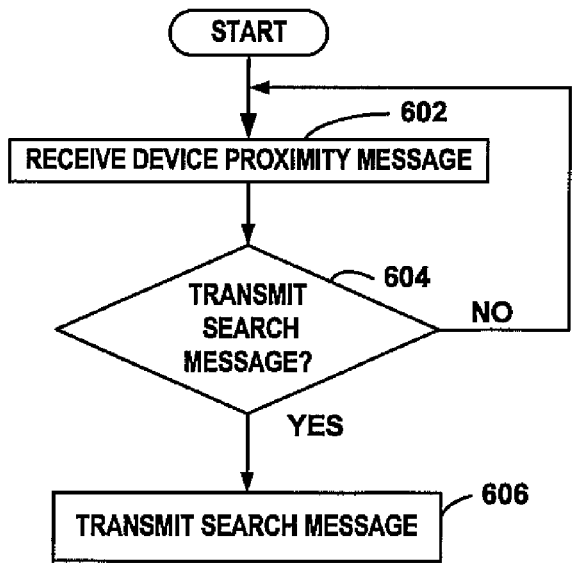
FIG. 6 is a flow chart of a method of managing communication services to the wireless communication device performed in the system infrastructure.

FIG. 6 is a flow chart of a method of managing communication services to the wireless communication device 108 performed in the system infrastructure. The method may be performed by any combination of hardware, software and/or firmware. The order of the steps discussed below may be varied and one or more steps may be performed simultaneously in some circumstances. In this example, the method is performed, at least in part, by executing code on the controller 110 in the system infrastructure 102.

At step 602, the device proximity message is received from the detecting base station 104. As described above, the device proximity message is sent through the IP network and routed through the access gateway to the controller 110. The controller 110 extracts information from the device proximity message which includes at least information identifying the wireless communication device 108.

At step 604, it is determined whether the search message 118 should be transmitted to the wireless communication device 108. The controller 110 may evaluate any number of factors in accordance with known techniques for managing handoffs and communication resources in determining whether to transmit the search message. In some circumstances, as described with reference to FIG. 8, the threshold may be relatively low and the controller determines to send the search message solely in response to receiving the device proximity message. In other circumstances, the controller 110 may apply the same criteria as used to determine whether to handoff a device from one base station to another. Some examples of criteria that may be evaluated by the controller 110 include bandwidth requirements, capacity of the base stations, QoS levels priority levels, and costs. If the controller determines that the search message should be sent, the procedure continues at step 606. Otherwise, the method returns to step 602.

At step 606, the search message is generated and transmitted to the wireless communication device 108. The controller 110 generates a search message in accordance with page messaging techniques. As discussed above, the search message includes information for adapting the search parameters of the base station searching scheme used by the wireless communication device. When invoking the changes contained in the search message, the wireless communication device increases the likelihood of detecting the base station 104 in a shorter time than if the changes are not made. The search message is transmitted from the macro base station.

Figure 7:
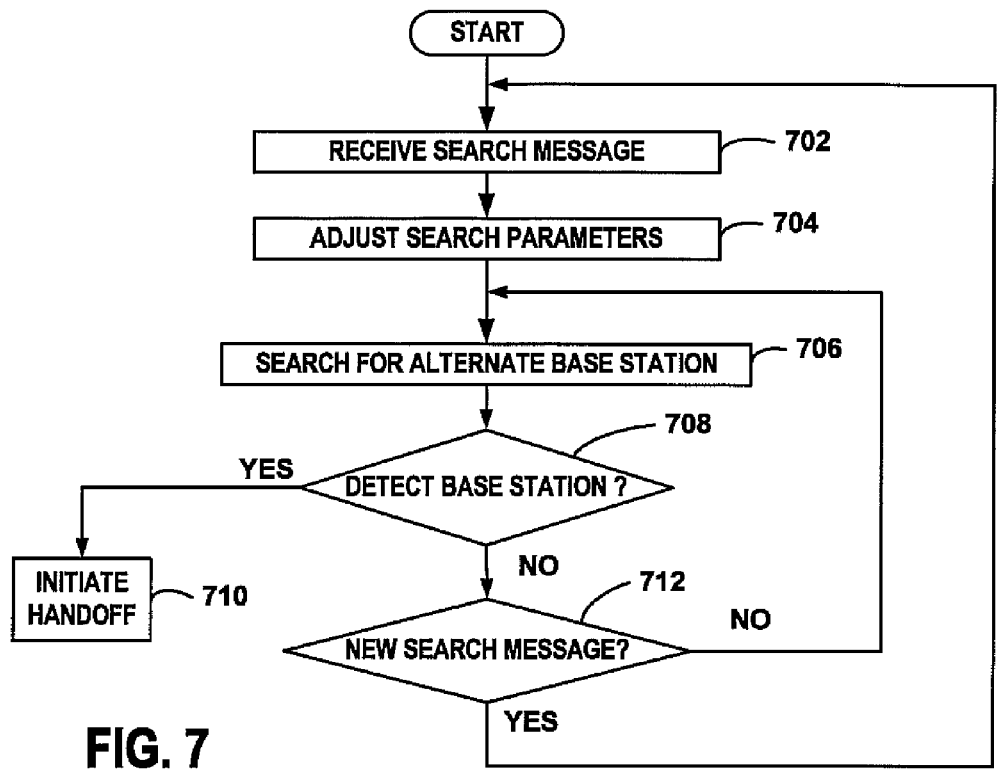
FIG. 7 is a flow chart of a method performed at the wireless communication device after receiving the search message.

FIG. 7 is a flow chart of method performed at the wireless communication device after receiving the search message. The method is performed, at least partially, by executing code in the wireless communication device 108.

At step 702, the search message is received. In accordance with known techniques, the wireless communication device periodically monitors the downlink paging channels to receive control messaging from the system infrastructure 102 during the non-traffic state. The search message is received and deciphered to extract the information related to changes to the search parameters.

At step 704, the changes included in the search message are applied to the search scheme of the wireless communication.

At step 706, the newly applied search parameters are applied in searching for an alternate base station. The wireless communication device 108 tunes a downlink receiver in accordance to the searching scheme to search for a pilot signal transmitted from the detecting base station 104 (such as a femtocell base station). In some circumstances, the wireless communication device may search for beacons or other signals transmitted from the femtocell base station 104.

At step 708, it is determined whether the base station 104 has been detected. If a signal from the base station 104 is detected, the method continues at step 710, where handoff is initiated in accordance with known techniques. Otherwise, the method continues at step 712.

At step 712, it is determined whether a new search message is being transmitted. If so, the method returns to step 702 to receive the new search message. Otherwise, the method returns to step 706 to continue searching for the femtocell base station.

Figure 8:
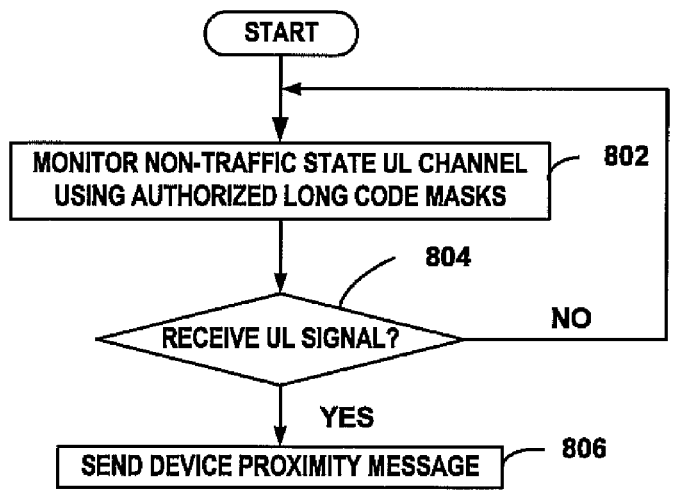
FIG. 8 is a flow chart of a method of managing communications performed at a detecting base station such as a femtocell base station where the device proximity message is transmitted in response to receiving the non-traffic state uplink signal from an authorized wireless communication device.

FIG. 8 is a flow chart of a method of managing communications performed at a detecting base station 104, such as a femtocell base station, where the device proximity message is transmitted in response to receiving the non-traffic station uplink signal from an authorized wireless communication device 108. The method of FIG. 8 provides an example of monitoring the non-traffic state uplink channels. Other techniques may be used in some situations. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 416 in the detecting base station 104.

At step 802, the non-traffic state uplink channels are monitored for a non-traffic state uplink signal that is transmitted with a PLCM corresponding to an authorized communication device in the user list stored in memory of the detecting base station 104. The wireless communication device uplink receiver 114 attempts to decode incoming signals using the PLCM derived from the device identification values. The device identifiers, such as EINs, MEIDs, or IMSIs, are applied in accordance with known techniques and the convention of the macrocell base station 106 to generate a PLCM for each authorized device. Demodulated signals are decoded using the PLCMs to attempt to decode the incoming signals. In some cases the PLCM maybe assigned by the base station 106.

At step 804, it is determined if a non-traffic state uplink signal has been received from an authorized wireless communication device 108. If an incoming signal is successfully decoded, the controller 416 determines that the non-traffic state uplink signal 112 has been received and transmits the device proximity message at step 806. Otherwise, the method returns to step 802 to continue monitoring the uplink channels.

Figure 9:
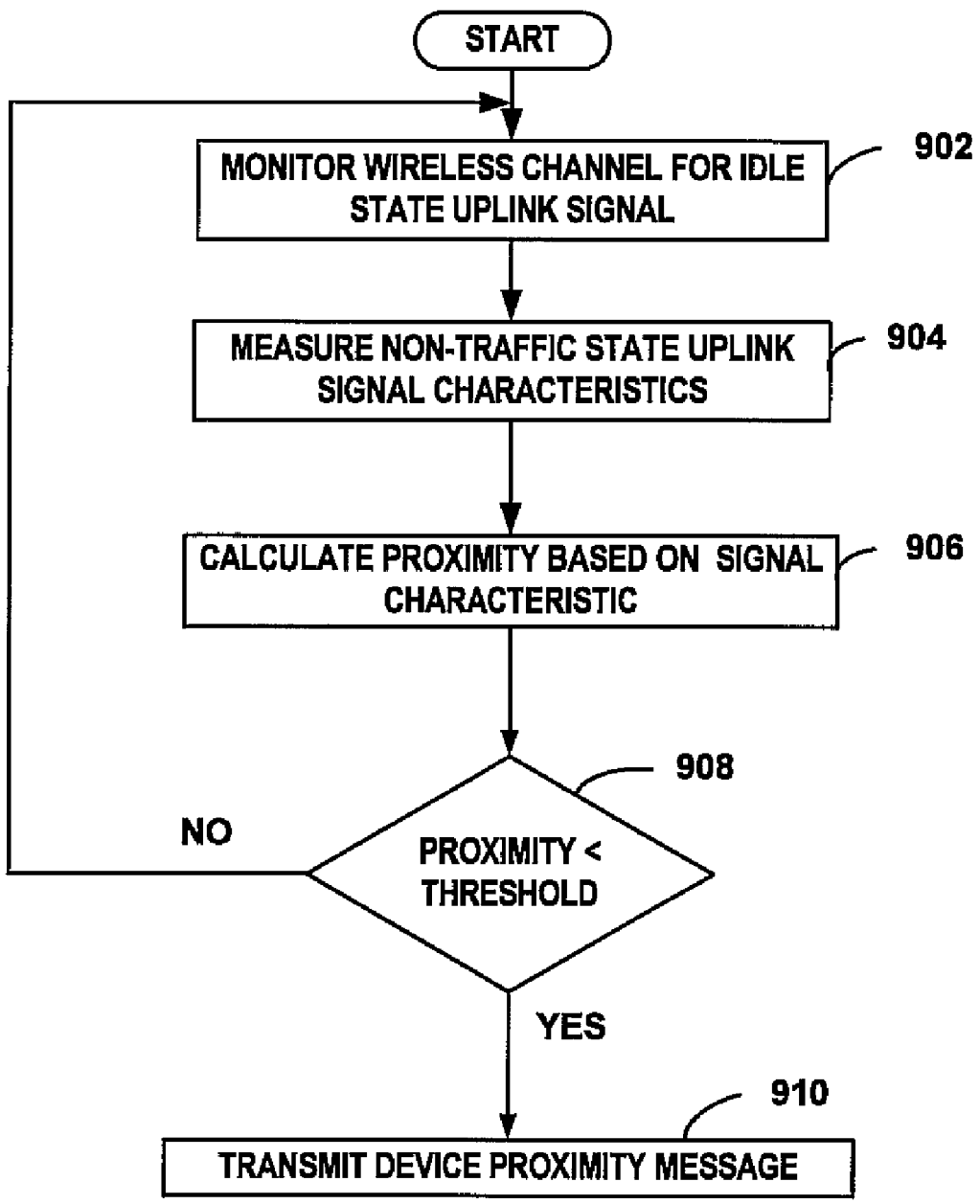
FIG. 9 is a flow chart of a method of managing communications where the proximity of the wireless communication device to the detecting base station is determined based on the non-traffic state uplink signal.

FIG. 9 is a flow chart of a method of managing communications where the proximity of the wireless communication device 108 to the detecting base station 104 is determined based on the non-traffic state uplink signal. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 416 in the detecting base station 104. The method described with reference to FIG. 9 provides and alternative to technique of FIG. 8 where the device proximity message is sent in response to successfully decoding the non-traffic state uplink signal.

At step 902, the wireless channel that may contain the non-traffic state uplink signal is monitored. The wireless communication device receiver 114 attempts to demodulate and/or decode incoming signals within the wireless communication channel.

At step 904, a characteristic of the non-traffic state uplink signal is measured. One or more parameters such as power level or signal travel time are measured.

At step 906, the proximity of the communication device 108 to the detecting base station 104 is calculated. The proximity calculation may be based on any number of parameters or characteristics of the received non-traffic state signal as well as other factors. Examples of suitable parameters include parameters related to signal power level and a timing offset between a transmission and reception times. Other related factors may include transmission power level, location of one or more base stations and information extracted from detection signal and downlink signals such as time stamps, power level indicators, and power control indicators. In some circumstances, the proximity is based only on a detection of the uplink signal as discussed with reference to FIG. 8. The particular factors and calculation techniques depend on the type of communication system 100.

At step 908, it is determined whether the communication device 108 is close enough to the detecting base station 104 to justify transmitting the device proximity message 116. The calculated proximity is compared to a proximity threshold. If the estimated proximity is less than the threshold, the method continues at step 910 where the device proximity message 116 is transmitted. Otherwise, the method returns to step 902. In some circumstances, this step may be omitted and the femtocell base station 104 may send proximity information to the core network with other information to allow the system 100 to make the determination of whether a communication device 108 should acquire service from the detecting base station 104 and whether the macrocell base station 106 should transmit the search message.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A detecting base station comprising:
a receiver configured to receive, from a wireless communication device in a non-traffic state, a non-traffic state uplink signal transmitted to an originating base station;
a network interface configured to transmit a device proximity message at least indicating that the non-traffic state uplink signal was received from the wireless communication device, the device proximity message invoking transmission of a search message instructing the wireless communication device to adjust a search scheme being used by the wireless communication device for finding signals transmitted from an alternate base station, wherein the search message instructs the wireless communication device to increase a frequency of activation of circuitry to search for the alternate base station without instructing the wireless communication device to immediately activate the circuitry.

2. The base station of claim 1, wherein the search message comprises a least one parameter to adjust the search scheme, the at least one parameter comprising one or more of a period between searches, a period between searches of identified frequencies, a duration of search, a search offset, a location of starting search within a search-space, and a search receiver setting.

3. The base station of claim 1, wherein the search message instructs the mobile communication device to adjust the search scheme to increase a likelihood of detecting a signal transmitted by the detecting base station.

4. The detecting base station of claim 1, wherein the device proximity message invokes the transmission of the search message from the originating base station.

5. The detecting base station of claim 4, wherein the device proximity message invokes the transmission of the search message from the originating base station in a non-traffic state downlink channel.

6. The detecting base station of claim 5, wherein the device proximity message invokes the transmission of the search message from the originating base station in a paging channel.

7. The detecting base station of claim 1, wherein the originating base station is a macrocell base station providing wireless service within a macrocell geographical service area larger than the detecting base station geographical service area of the detecting base station.

8. The detecting base station of claim 7, wherein the detecting base station geographical service area is a femtocell service area within the macrocell geographical service area.

9. The detecting base station of claim 1, wherein the non-traffic state uplink signal comprises information related to at least one of a handoff procedure, an acknowledgement procedure, a registration procedure, a resynchronization procedure, a network access request, and a response message transmission.

10. The detecting base station of claim 1, further comprising:
a controller configured to determine a proximity of the wireless communication device to the detecting base station based on at least one characteristic of the non-traffic state uplink signal and to generate the device proximity message when the proximity is less than a proximity threshold.

11. The detecting base station of claim 1, further comprising: a memory storing device information corresponding to an authorized wireless communication device authorized to use the detecting base station, wherein the receiver is configured to apply a public long code mask (PLCM) generated from the device information to receive the non-traffic state uplink signal.

12. A wireless communication system comprising:
an originating base station; and
a detecting base station configured to send a device proximity message in response to receiving, from a wireless communication device in a non-traffic state, a non-traffic state uplink signal transmitted to the originating base station, the originating base station configured to transmit, in response to the device proximity message, a search message instructing the wireless communication device to adjust a search scheme being used by the wireless communication device for finding signals transmitted from an alternate base station, wherein the search message instructs the wireless communication device to increase a frequency of activation of circuitry to search for the alternate base station without instructing the wireless communication device to immediately activate the circuitry.

13. The wireless communication system of claim 12, wherein the search message comprises a least one parameter to adjust the search scheme, the at least one parameter comprising one or more of a period between searches, a period between searches of identified frequencies, a duration of search, a search offset, a location of starting search within a search-space, and a search receiver setting.

14. The wireless communication system of claim 12, wherein the originating base station is configured to transmit the search message to the wireless communication device using a non-traffic state downlink channel.

15. The wireless communication system of claim 14, wherein the originating base station is configured to transmit the search message to the wireless communication device using a paging channel.

16. The wireless communication system of claim 12, wherein the originating base station is a macro base station providing wireless service within a macrocell geographical service area larger than the detecting base station geographical service area of the detecting base station.

17. The wireless communication system of claim 16, wherein the detecting base station geographical service area is a femtocell service area within the macrocell geographical service area.

18. The wireless communication system of claim 12, wherein the non-traffic state uplink signal comprises information related to at least one of a handoff procedure, an acknowledgement procedure, a registration procedure, a resynchronization procedure, a network access request, and a response message transmission.

19. The wireless communication system of claim 12, the detecting base station further comprising:
 a controller configured to determine a proximity of the wireless communication device to the detecting base station based on at least one characteristic of the non-traffic state uplink signal and to generate the device proximity message when the proximity is less than a proximity threshold.

\* \* \* \* \*